United States Patent [19]

Kinjo

[11] 3,732,362

[45] May 8, 1973

[54] SIGNAL PROCESSING SYSTEM FOR MAGNETIC RECORDING AND REPRODUCING APPARATUS

[75] Inventor: Hisao Kinjo, Minami-ku, Yokohama, Japan

[73] Assignee: Victor Company of Japan, Limited, Kanagawa-ku, Yokohama City, Japan

[22] Filed: Aug. 11, 1969

[21] Appl. No.: 848,900

[30] Foreign Application Priority Data

Aug. 14, 1968 Japan ..............................43/57478

[52] U.S. Cl. ....178/6.6 DD, 178/6.6 FS, 178/6.6 DO

[51] Int. Cl. ..........................H04n 5/78, G11b 21/02

[58] Field of Search .....................178/6.6 A, 6.6 DD, 178/6.6 P, 6.6 FS, 6.6 SF, 6.6 DO

[56] References Cited

UNITED STATES PATENTS

| | | | |
|---|---|---|---|
| 3,548,095 | 12/1970 | Poulett | 178/6.6 D |
| 3,395,248 | 7/1968 | Suzuki et al. | 178/6.6 FS |

OTHER PUBLICATIONS

Publication I–"Reviewing Slow-Motion Disc Principles," Broadcast Engineering Feb. 28, 1969, P. 14–16, & 18.

*Primary Examiner*—J. Russell Goudeau
*Attorney*—Louis Bernat

[57] ABSTRACT

This is a signal processing system for magnetic recording and reproducing apparatus using a circular, rotary magnetic body on which video signals, for example, are recorded and reproduced a plurality of magnetic heads intermittently and alternately move radially over said rotary magnetic body, each field of the video signals being recorded in one concentric circular track. Slow motion playback or still playback of the signal recorded in circular said track is effected by reproducing the signal a plurality of times. This signal processing system synchronizes and shape field setting pulses by frame pulses of an external reference synchronizing signal. The relation between odd number fields and even number fields of a reproduced video signal can be made to agree with the relation between odd number fields and even number fields of the external reference synchronizing signal.

7 Claims, 58 Drawing Figures

INVENTOR

HISAO KINJO

BY Louis Bernat

ATTORNEY

INVENTOR

HISAO KINJO

BY

ATTORNEY

INVENTOR

HISAO KINJO

BY Louis Bernat

ATTORNEY

Fig. 7A, Fig. 7B, Fig. 7C, Fig. 7D, Fig. 7E, Fig. 7F, Fig. 7G, Fig. 8A, Fig. 8B, Fig. 8C, Fig. 8D, Fig. 8E, Fig. 8F, Fig. 8G, Fig. 8H, Fig. 8I, Fig. 8J, Fig. 8K, Fig. 8L, Fig. 8M, Fig. 8N, Fig. 8O
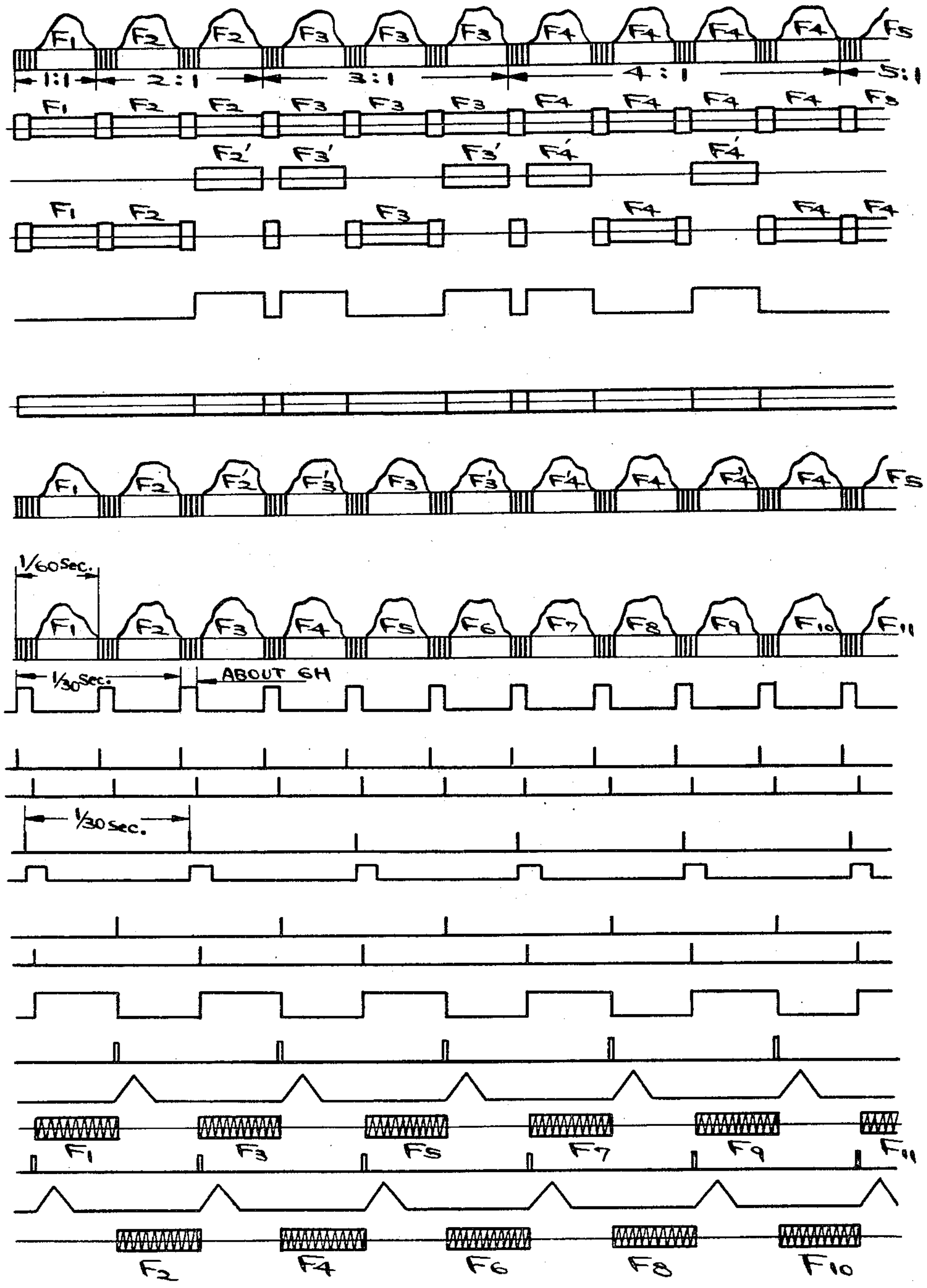
INVENTOR
HISAO KINJO
BY Louis Bernat
ATTORNEY INVENTOR
HISAO KINJO
BY Louis Bernat
ATTORNEY

SIGNAL PROCESSING SYSTEM FOR MAGNETIC RECORDING AND REPRODUCING APPARATUS

The present invention relates in general to apparatus for magnetically recording signals on and reproducing the same from a circular rotary magnetic body. In particular, the invention is concerned with a signal processing system, for such apparatus for recording signals on and reproducing the same from a rotary magnetic body which positively effects good field settings in slow motion playback or still playback.

Generally, a standard video signal produces an interlacing of the scanning lines by its odd number fields and its even number fields. A picture of one frame is formed by two fields to produce 30 frame pictures in 1 second. When a recording is made by using a frame signal as a unit for still or slow motion playback, there is no degradation of the reproduced picture in vertical resolution. However, this system is not without a defect. If there are fast motions of an image in the picture between the first field and the second fields, the subject is in motion between the two fields, so that an image shake or a blur is produced in the reproduced picture. This makes a prominent discontinuity of motions which impresses the viewers as being awkward.

To be free from the aforementioned defect, still or slow motion playback requires that recording and playback be effected by using a field signal as a unit. In this system, signals are processed to cope with a deviation corresponding to the H/2 period (H represents the horizontal scanning period) between odd number fields and even number fields. Thus, it is necessary to provide a deviation of H/2 when the same fields or only the odd number fields are to be reproduced repeatedly many times. It is necessary to perform the deviation opeations repeatedly when reproducing odd number or even number fields repeatedly many times from the same fields or a field setting operation.

The present invention is intended t satisfy the aforementioned requirement.

Accordingly, a principal object of the present invention is to provide a signal processing system for apparatus for recording signals on and reproducing the same from a rotary magnetic body which permits good field setting.

Another object of the invention is to provide a signal processing system for apparatus for recording signals on and reproducing the same from a rotary magnetic body which permits either still playback or slow motion playback, without causing either an image shake or a blurred image in the reproduced still or slow motion pictures.

Still another object of the invention is to provide a signal processing system for apparatus for recording signals on and reproducing the same from a rotary magnetic body which permits switching from normal playback speeds to variable slow motion playback or still playback or vice versa as described.

Additional objects as well as features and advantages of the invention will become evident from the description set forth hereinafter when considered in conjunction with the accompanying drawings, in which.

Figures 9A, 9B, 9C, 9D, 9E, 9F, 9G, 9H, 9I, 9J, 9K, 9L, 9M, 9N:
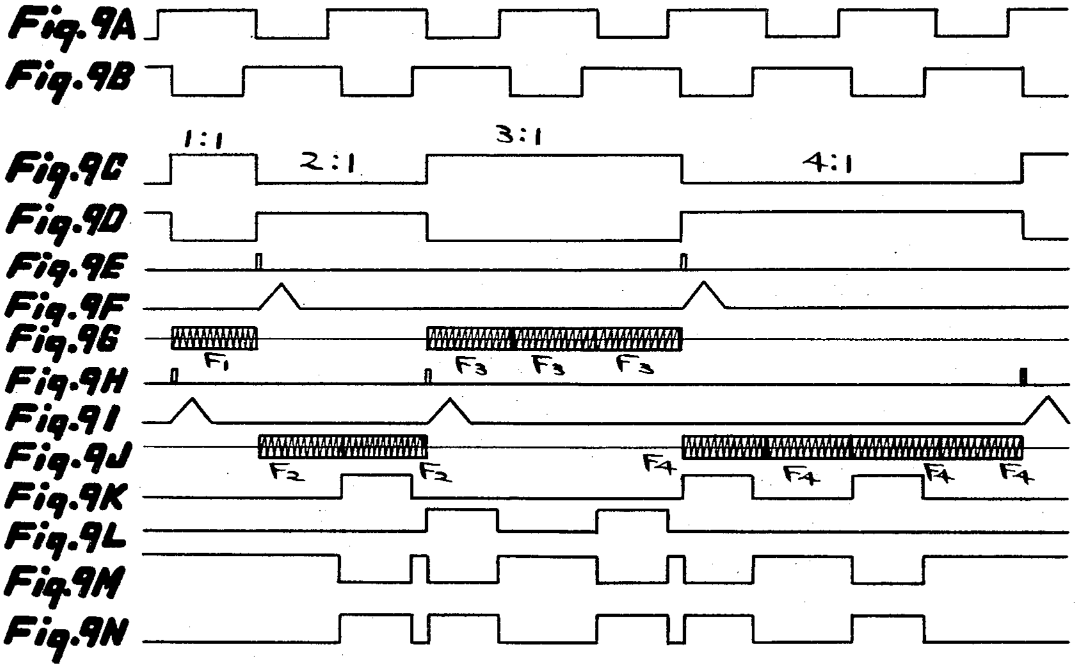
Figure 10A:
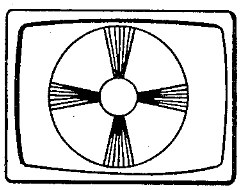
Figure 10B:
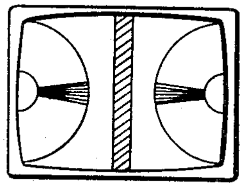

FIGS. 5(A) to 5(I) are wave forms showing the relation between field setting switching pulses and the standard video signals in the inventive system;

FIGS. 6(A) to 6(G) show wave forms of synchronizing signals for the standard video signals;

FIGS. 7(A) to 7(G) show wave forms of field setting switching pulses which permits variable slow motion in the system according to this invention;

FIG. 8(A) to 8(O) show wave forms in explanation of one order in which switching pulses are shaped in the system according to this invention;

FIGS. 9(A) to 9(N) show wave forms in explanation of another order in which switching pulses are shaped in the system according to this invention; and FIGS. 10(A) and 10(B) show pictures in which setting is effected.

Figure 1:
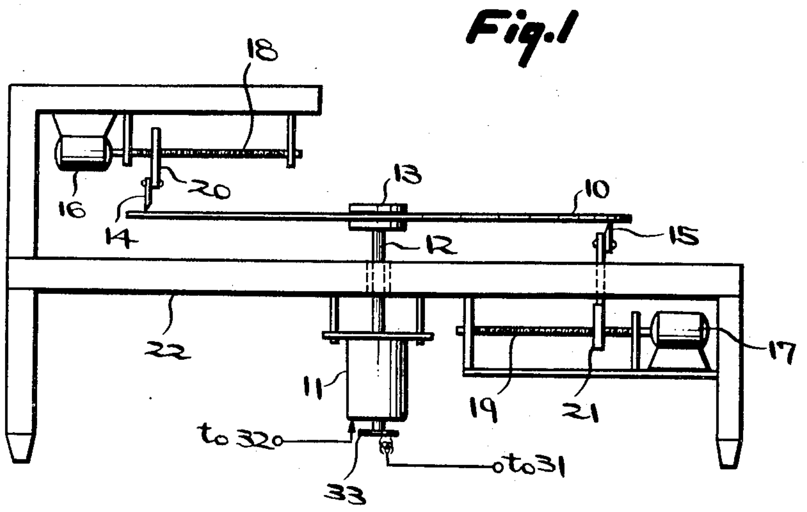
FIG. 1 is a front view of one embodiment of the apparatus for recording signals on and reproducing the same from a circular rotary magnetic body in which the system according to this invention can be incorporated.

In FIG. 1, a magnetic sheet 10 has magnetic surfaces on the upper surface and the underside. Sheet 10 is irmly fixed to a hub 13 of a rotary shaft 12 of a drive motor 11 which is adapted to rotate in the direction of arrow X (FIG. 2) at 3,600 r.p.m., in synchronism with the vertical synchronizing signals of video signals. Magnetic heads 14 and 15 are mounted in positions diametrically opposed each other on opposite sides of the rotary shaft 12. Head 14 makes contact on the upper surface, and head 15 makes contact underside; of the magnetic sheet 11, respectively. These heads provide for recording video signals on and reproducing the same from the opposite surfaces of the magnetic sheet 10. These magnetic heads 14 and 15 are suported by magnetic head supports 20 and 21, respectively, which include half nuts threadably engaging feed screws 18 and 19. These screws are directly connected to rotate with the shafts of pulse motors 16 and 17 respectively. Drive motor 11 and pulse motors 16 and 17 are mounted on a back plate 22.

In the embodiment shown and described, the angle of rotation (the angle through which the rotary shaft rotates for each input pulse) responsive to one step of the intermittent rotation movement of the pulse motors 16 and 17 is selected to be 15°. The magnetic heads 14 and 15 can be moved a distance corresponding to two pitches on the magnetic sheet 10 responsive to four steps of intermittent rotation of the pulse motors 16 and 17, or a rotation of the rotary shafts of the pulse motors through 60°. Accordingly, the magnetic heads are moved radially across the magnetic sheet by a distance corresponding to two track pitches responsive four pulses, or a distance corresponding to one track pitch by two pulses.

Figure 2:
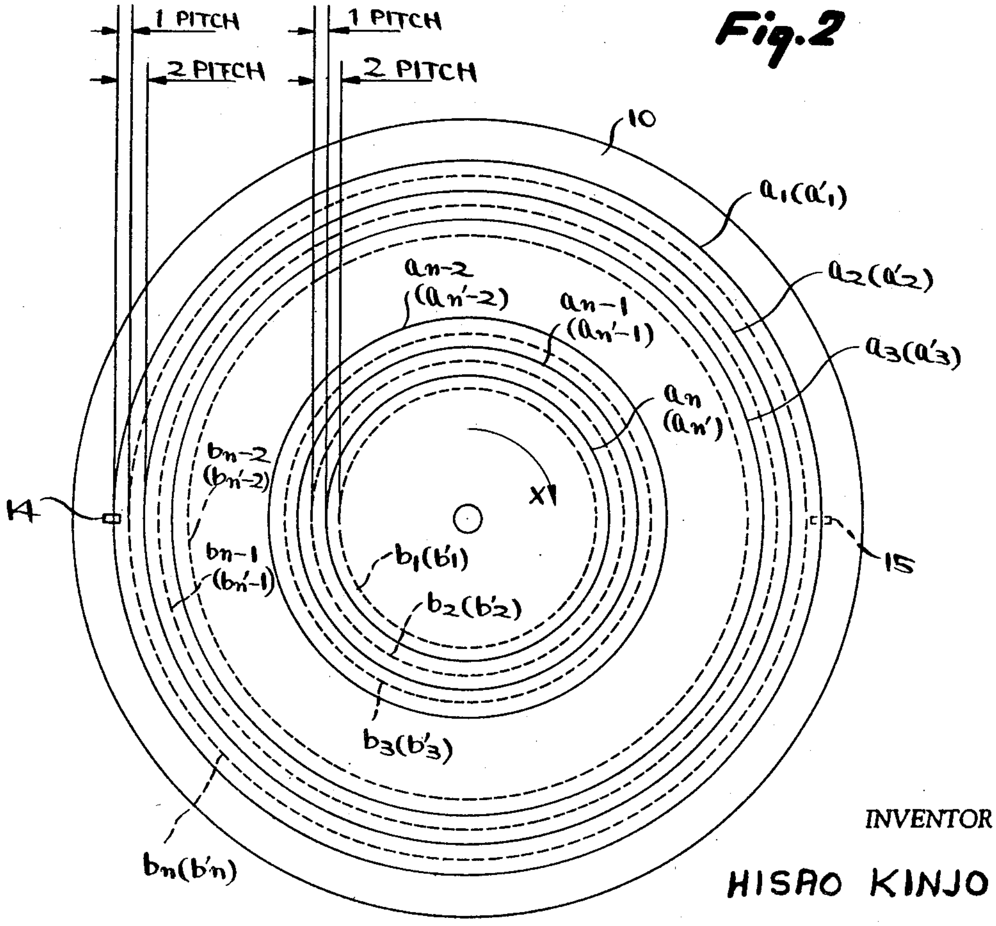
FIG. 2 is a view showing a track pattern on a magnetic sheet.

The magnetic head 14 first records one field or one frame of a video signal in a track $a_1$ on the upper surface of the magnetic sheet 10, as shown in FIG. 2. The magnetic head 15 then records one frame or one field of a video signal in a track $a_1'$ on the underside of the magnetic sheet 10. During this time, the pulse motor 16 rotates through an angle of 60° so that the magnetic head 14 moves radially inwardly over the magnetic sheet by a distance corresponding to two track pitches.

In the embodiment shown and described, the track pitch is set at 130 $\mu$. After the magnetic head 15 completes its recording, the magnetic head 14 records one frame or one field of a video signal in a track $a_2$ on the upper surface of the magnetic sheet 10. During the time while head 14 is recording the magnetic head 15 is moved radially inwardly over the magnetic sheet by a distance corresponding to two track pitches. Thus, the magnetic heads 14 and 15 are alternately and intermittently moved radially inwardly over the magnetic sheet until they reach tracks $a_n$ and $a_n'$, respectively. Then, they are moved a distance corresponding to one track pitch to innermost tracks $b_1$ and $b_1'$ respectively.

The direction of movement of the magnetic heads 14 and 15 is reversed when they reach the tracks $b_1$ and $b_1'$. The magnetic heads 14 and 15 intermittently move radially outwardly over the magnetic sheet by a distance corresponding to two track pitches. Accordingly, the tracks $b_1$ ($b_1'$) to $b_n$ ($b_n'$) are formed during the outward movement of the magnetic heads 14 and 15. Each of these 'b' tracks is positioned between the adjacent tracks $a_1$ ($a_1'$) to $a_n$ ($a_n'$) which are formed during the inward movement of the magnetic heads. The inward movement tracks and the outward movement tracks being are disposed alternately. Upon reaching the outside tracks $b_n$ and $b_n'$ respectively, the magnetic heads 14 and 15 are moved a distance corresponding to one track pitch to reach the outermost tracks $a_1$ and $a_1'$ respectively. Upon reaching the tracks $a_1$ and $a_1'$ respectively, the magnetic heads 14 and 15 first erase the signals already recorded there, and then they record new signals. This operation is repeated to record video signals while the magnetic heads are intermittently moved inwardly until a desired point in time is reached. The same process is repeated during the playback operation.

As described hereinabove, video signals are recorded on the upper surface and underside of the magnetic sheet 10 while it is rotating about the rotary shaft 12, at a predetermined angular velocity. A number of concentric circular tracks are formed by the magnetic heads 14 and 15, alternately and intermittently, moved radially inwardly or outwardly over the magnetic sheet in a predetermined cycle-in the embodiment shown and described.

Figure 3:
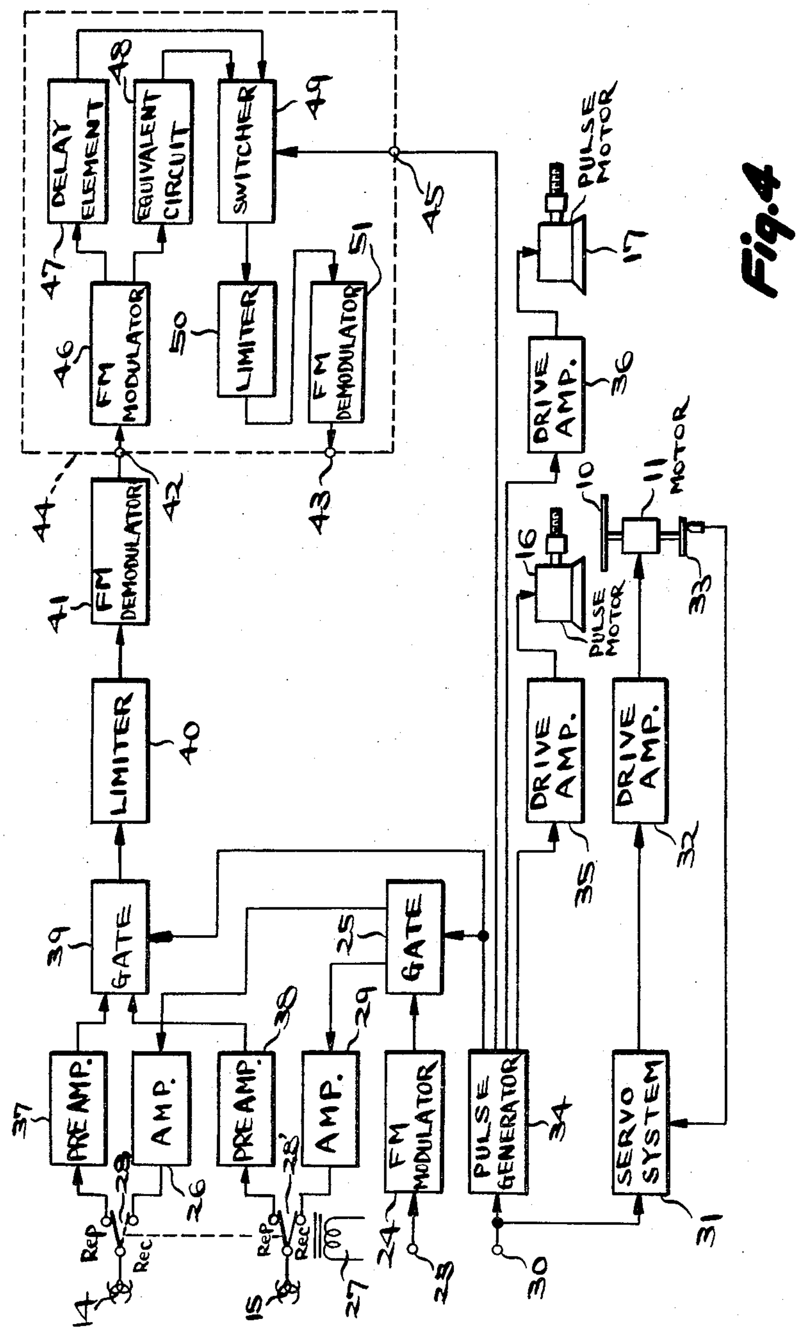
FIG. 3 is an overall systematic block diagram of one embodiment of the system according to this invention.

Operation of the embodiment will now be explained with reference to FIG. 3. In a recording operation, a video signal applied to an input terminal 23 is converted, at a FM modulator 24, into a frequency modulated wave which is supplied to a recording switching gating circuit 25. On one hand, a frequency modulated wave is fed from gate 25 to the magnetic head 14 through a recording amplifier 26 and a relay switch 28 operated to terminal "Rec," the recording side, by a relay 27. The modulated wave is thus recorded on the upper surface of the magnetic sheet 10. On the other hand, a frequency modulated wave is also fed from gate 25 to the magnetic head 15 through a recording amplifier 29 and a relay switch 28' (coupled to said relay switch 28) operated to contact the recording side "Rec." Thus, the signal may also be recorded on the underside of the magnetic sheet 10.

An external reference signal applied to other input terminal 30 is transmitted on one hand, to a servo system circuit 31, from which it is fed through a motor drive amplifier 32 to the drive motor 11. Responsive thereto, the magnetic sheet 10 rotates at a rate corresponding to one field (60 revolutions per second, for example) or one frame (30 revolutions per second, for example) of a video signal. Mounted on the rotary shaft of the drive motor 11 is a known tone wheel 33 which produces a series of pulses having a cycle of one field or one frame. The series of pulses are supplied to the servo system circuit 31 to rotate the drive motor 11 at a constant rate.

An external reference signal is supplied, on the other hand, from terminal 30 to a switching pulse generator 34. Responsive thereto, switching pulses are supplied through drive amplifiers 35 and 36 to the pulse motors 16 and 17 which intermittently operate when the switching pulses appear.

In reproducing a recorded signal, the pulse motors 16 and 17 and the drive motor 11 are operated in the same fashion as they are operated during the recording of signals. However, when the recorded signal is reproduced at the same rate of scanning as in recording, the reproduced signal from the magnetic head 14 is supplied through contacts 28 and pre-amplifier 37 to a playback switching gating circuit 39. At this time, the relay switch 28 is operated to the playback side "Rep" by the relay 27. The reproduced signal from the magnetic head 14 is gated at the playback switching gating circuit 39 by the switching pulses from the switching pulse generator 34, to provide an output signal.

The reproduced signal from the magnetic head 15 is supplied through a pre-amplifier 38 to the playback switching gating circuit 39. The path is through the relay switch 28' (coupled to the relay switch 28) operated by the relay 27 to contact the playback side "Rep." The reproduced signal from the magnetic head 15 is gated at the playback switching gating circuit 39 by the switching pulses from the switching pulse generator 34 to provide an output signal.

These output signals are combined and transmitted to a limiter 40 and a FM demodulator 41. The video signal is detected at demodulator 41 and supplied to a terminal 42.

The circuit 44 form terminal 42 to an output terminal 43 is a field setter circuit 44 which forms the subject matter of this invention. Circuit 44 is subsequently to be explained in detail with reference to FIG. 4, so that the explanation thereof will be omitted now. The switching pulses from the switching pulse generator 34 are supplied to a terminal 45 of the field setter circuit 44.

From the foregoing description, it will be appreciated that the apparatus provides for magnetically recording signals on and reproducing the same from a rotary magnetic sheet. The driving pulses are in synchronism with the rotation of the drive motor 11 or in synchronism with the vertical synchronizing signal of an input video signal, and the pulses are deviated by 180° in time. These driving pulses operate the pulse motors 16 and 17 to rotate the feed screws 18 and 19 in reverse phase and to intermittently and alternately move the magnetic heads 14 and 15 radially inwardly or radially outwardly the magnetic sheet 10. One field or one frame of a video signal is recorded during one complete revolution of the magnetic sheet while the magnetic heads 14 and 15 are stationary. In playback, slow motion pictures can be produced by varying the rates of movements of the magnetic heads 14 and 15 as desired; or, still pictures can be produced by stopping the movements of the magnetic heads 14 and 15.

The features of the field setting system according to this invention will now be explained item by item.

1. Frame pulses synchronize the phase of frequency modulated signals introduced to the magnetic heads at the time of recording and the field setting switching pulses at the time of playback. This is equivalent to recording and reproducing odd number fields alone, for example, by the magnetic head 14 in the first channel. Even number fields are recorded alone, for example, by the magnetic head 15 in the second channel. Thus, the recording and playback are made possible by locking frequency modulated signal switching pulses for introducing frequency modulated signals to each magnetic heads to effect switching recording and pulse motor control pulses by frame pulses. The field setting processing of signals to cope with a deviation corresponding in time to the H/2 period. This setting is effected by the switching pulses which are not locked in phase by the frame pulses in slow motion or still picture playback.

Thus, the field setting can be effected in two different manners: in one manner, the field setting is effected such that the relation between the odd number fields and even number fields of the reproduced signal, that has been subjected to field setting, agrees with the relation between the odd number fields and even number fields of the external reference synchronizing signal. In the other manner, the relation in the former is reversed from the relation in the latter.

Accordingly, reproduced pictures for monitor are seen after being synchronized by the external synchronizing signals, as shown in FIGS. 10(A) and 10(B). FIG. 10(A) shows a reproduced picture obtained when the relation between the odd number fields and even number fields of the reproduced signal has been subjected to a field setting which agrees with the relation between the odd number fields and even number fields of the external reference synchronizing signal. FIG. 10(B) shows a reproduced picture obtained when the relation between the odd number fields and even number fields of the former is reversed from the relation between the odd number fields and even number fields of the latter. The field setting is effected with a deviation in time corresponding to the H/2 period. Thus, if the field setting is effected as shown in FIG. 10(B), it would be impossible to sustain an inter-sync servo mode in which servo control is effected by comparing the horizontal phases of the external synchronizing signal and the reproduced synchronizing signal. It would not be possible to effect generator locking or fitting-in of the reproduced signal either.

Thus, if (1) the frequency modulated signals (FIGS. 8(L) and 8(O)) which are recorded by switching, (2) the control pulses (FIGS. 8(J) and 8(M)) which control the pulse motors 16 and 17, and (3) the switching pulses (FIG. 9(N)) which effect field setting are not completely synchronized, the aforementioned problem cannot essentially be obviated. Then, the pictures, which may be neither in the state of FIG. 10(A) nor FIG. 10(B) will be reproduced at random in slow motion or still reproduction.

This defect can be obviated by using frame signals (30 $H_z$) composed of odd number fields and even number fields of a video signal. That is, the signals are gated by frame pulses (FIG. 8(E)) and are perfectly field discriminated before being recorded or reproduced. Then the relation between the odd number fields and even number fields of the reproduced signal, that has been subjected to the field setting, can be made to agree with the relation between the odd number fields and even number fields of the external reference signal. The reproduced picture can be thus maintained in the state shown in FIG. 10(A). Various switching pulses may be prepared responsive to the external reference signal both in recording and playback.

2. Field setting switching pulses are used for processing signals to cope with a deviation in time corresponding to the H/2 period. These pulses are based on equalizing pulses and shaped into non-symmetrical switching pulses.

Figure 4:
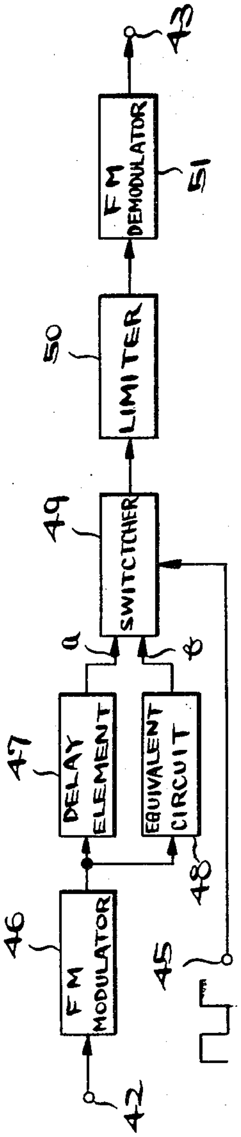
FIG. 4 is a systematic diagram of a field setter using a supersonic crystal delay element which forms an essential part of one embodiment of the inventive system.

FIG. 4 is a systematic diagram of the field setting circuit 44 using a supersonic crystal delay element which forms the subject matter of this invention. In FIG. 4, a demodulated video signal, from a slow motion device, is applied to the terminal 42. This signal is frequency modulated by a carrier wave of the center frequency of 30 $MH_z$ at at FM modulator 46. The frequency modulated signal is fed to a crystal, H/2 delay element 47 at the center frequency of 30 $MH_z$ and the time lag of 31.75 $\mu$ second. The frequency modulated signal is also fed to an equivalent circuit 48 having the same frequency characteristics as delay element 47. Thus, the signal is converted into a H/2 delay signal *a* and a non-delay (direct) signal *b*, to be supplied to a switcher 49. The switcher 49 effects switching responsive to field setting switching pulses supplied through a terminal 45, such that the delay signal *a* is passed on the plus side of said pulses, and the non-delay signal *b* is passed on the minus side thereof.

An output signal of the switcher 49 has its amplitude variation and switching noise removed at a limiter 50 and demodulated at a FM demodulator 51. The resulting video signal is taken out as a field set standard video output signal, through an output terminal 43. The switching by the switcher 49 may be effected during the blanking period of a vertical synchronizing signal or at the beginning or end of one field. However, if symmetrical rectangular wave pulses are used as switching pulses, applied to the terminal 45, the vertical synchronizing signal will naturally be delayed when, for example, the switching is effected alternately and successively for each field, during still reproduction. This will cause a deviation in time corresponding to the H/2 period for each field, making it impossible to maintain the repeat cycle of the vertical synchronizing signals at 1/60 second. Thus, the vertical synchronizing will be deviated vertically by a time difference corresponding to the H/2 period. Consequently interlacing can only be effected in an imperfect state.

FIG. 5 shows the relation between picture signals and field setting switching pulses. FIG. 5(A) shows standard picture signals. FIGS. 5(B) and 5(C) show field set video outputs and field setting switching pulses, respectively, obtained at the time of still reproduction. FIGS. 5(D) and 5(E) show the relation between video outputs and switching pulses obtained in the slow motion reproduction ratio time of 1:2. FIGS. 5(F) and 5(G) show the relation between video outputs and switching pulses obtained in slow motion reproduction ratio time of 1:3. FIGS. 5(H) and 5(I) show the relation between video outputs and switching pulses obtained at the time of a variable slow motion reproduction. The use of the symmetrical switching pulses in effecting field setting leaves the aforementioned problem unobviated.

Figure 6A:
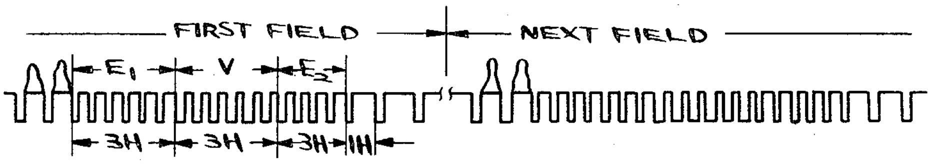

The problem can be solved by utilizing equalizing pulses, during the vertical synchronizing period, to shape the switching pulses for field setting into non-symmetrical switching pulses and by effecting the switching of the signals of the field setter during the 3 H period of equalizing pulses ($E_1$ and $E_2$ of FIG. 6(A)) before or after the vertical synchronizing period (V of FIG. 6(A)). Switching of the signals can be effected such that the vertical synchronizing pulse periods V of the fields are arranged on either the non-delay side of circuit 49, or the H/2 delay side depending on the fields. As shown in FIG. 6(A), equalizing pulses of 3 H × 3 = 9 H are inserted during the vertical synchronizing blanking period in a standard television synchronizing signal.

Interlacing, may be effected more positively. The repeat frequency of the horizontal synchronizing pulses is 15.75 $KH_z$ and that of the equalizing pulses is 31.5 $KH_z$. The pulse width of the horizontal pulse is 0.08 H and that of the equalizing pulse is 0.04 H. Thus, it is possible to discriminate between these pulses and the synchronizing signal and to separate the former from the latter.

Figure 6B:
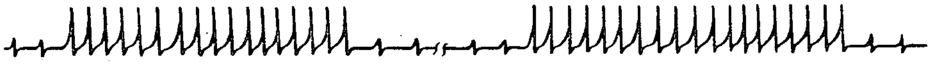
Figure 6C:
Figure 6D:
Figure 6E:
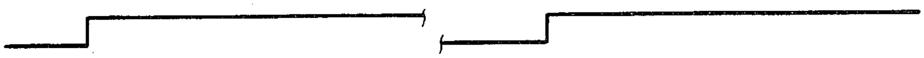
Figure 6F:

FIG. 6(B) shows an example of the picking out of the equalizing pulses from among the synchronizing signal of FIG. 6(A) by a resonant circuit. In order to remove all the influences of various noises existing in the synchronizing signal periods, the equalizing pulses are passed through an integrating circuit and shaped into a wave form shown in FIG. 6(C). The leading sides of the shaped wave form are used to trigger a monostable multivibrator of a time constant of suitable value (9 to 10 H). Thus, the wave form may include all of the 9 H periods of the equalizing pulses. FIG. 6(D) shows the wave form obtained when the equalizing pulses are passed through a differentiation circuit. When passed through an integrating circuit, the monostable multivibrator of the wave form shown in FIG. 6(E) operates with a time lag of about 1 H relative to the first equalizing pulses. Then, only the leading sides of the wave form of FIG. 6(E) is differentiated so as to trigger a monostable multivibrator of a time constant of about 6 H. Thus, the shaped pulses can be related in phase with the synchronizing signal of FIG. 6(A) on both leading and trailing sides. FIG. 6(F) shows pulses obtained by differentiating the leading sides of the pulses of FIG. 6(E).

FIG. 7 shows wave forms of field setting switching pulses formed by shaping the wave forms of the switching pulses to cope with a deviation in time corresponding to the H/2 period. Deviation is in non-symmetrical forms by the equalizing pulses. This permits a variable slow motion playback. FIG. 7(A) shows demodulated video signals (not field set) obtained from a slow motion device.

Next to be explained is the manner of effecting switching to cope with a deviation in time corresponding to the H/2 period. Normal playback is changed into variable slow motion playback while varying the slow motion ratio. The signal processing copes with a deviation in time corresponding to the H/2 period. The signal is fully processed during transition from normal playback of 1 : 1 to a variable slow motion playback of $n$ : 1. Then it is possible to convert normal playback to variable slow motion playback or still playback as desired.

Figure 5A:
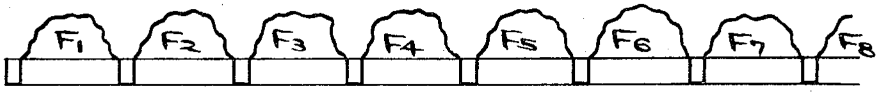
Figure 5B:
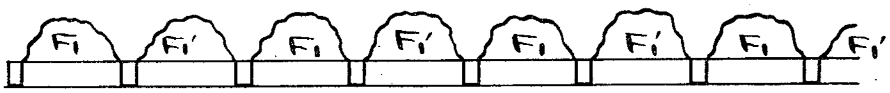
Figure 5C:
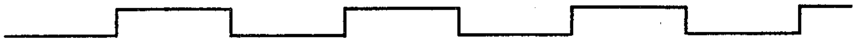
Figure 5D:
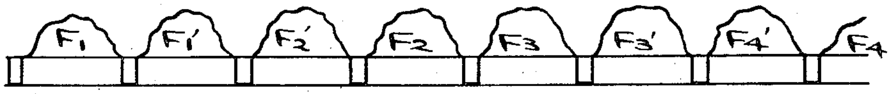
Figure 5E:
Figure 5F:
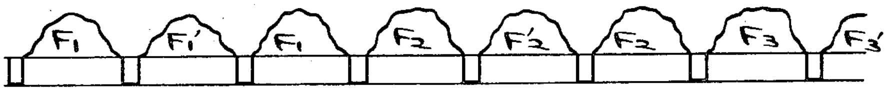
Figure 5G:
Figure 5H:
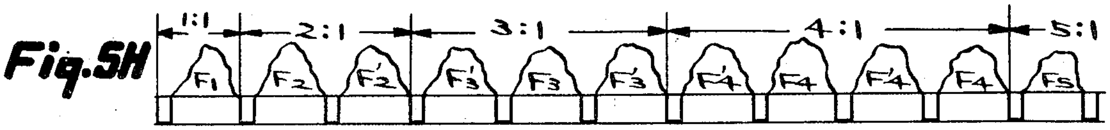
Figure 5I:
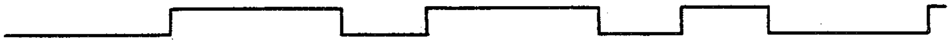

FIG. 7(A) show video signals, with the letters $F_1$, $F_2$, $F_3$... $F_n$ referring to the field number. $F_1$, $F_3$, $F_5$ ... refer to odd number fields recorded and reproduced by the magnetic head 14. The letters $F_2$, $F_4$, $F_6$... refer to even number fields recorded and reproduced by the magnetic head 15. FIG. 7(B) shows signals which are frequency modulated by a carrier wave of 30 $MH_z$ at the FM modulator 46, of FIGS. 3 and 4. The letters $F_1'$, $F_2'$, $F_3'$ ... refer to signals that have been passed by the crystal delay element 47. The switching of the signals of FIGS. 5(A) and 5(B), for effecting a delay of the H/2 period and a non-delay, is carried out as shown in FIGS. 5(C) and 5(D). To attain the end, switching pulses for field setting as shown in FIG. 7(E) are automatically produced in conjunction with some manipulation of the apparatus. The field setting is effected fully, as shown in FIG. 7(G). In the wave forms of field setting switching pulses shown in FIG. 7, delayed signals $F_2'$, $F_3'$, $F_4'$ ... that have been passed by the H/2 delay element cause only the video signal component of the one field period to be delayed by virtue of their having been shaped into non-symmetrical switching pulses. The switching of signals is effected during the equalizing pulse periods responsive to the equalizing pulses. The vertical synchronizing signal periods of the reproduced signals are permitted to pass directly without being delayed as shown in FIG. 7(D). This arrangement overcomes the problem of deviation from 1/60 second synchronizing of the vertical synchronizing signals, by a period corresponding to the H/2 period which is encountered when switching is effected by using pulses of symmetrical wave forms. Thus, the reproduced picture signals (FIG. 7(G)) that have been processed by field setting can be interlaced in a stable manner.

3. Frequency modulated signals for heads switching pulses and field setting switching pulses are gated to fully shape various types of setting pulses.

FIGS. 8 and 9 show wave forms illustrating the order of shaping and the phase in time of various types of switching pulses as well as their relation to the stepping and stopping of the pulse motors. FIGS. 8 and 9 summarize the foregoing description of the field setting system according to this invention.

Figure 6G:
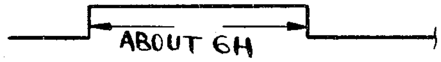

FIG. 8(A) shows standard picture signals. FIG. 8(B) shows a monostable multivibrator wave form which is triggered by equalizing pulses as shown in FIG. 6(G). FIGS. 8(C) and 8(D) show, respectively, pulses taken out by differentiating the leading and trailing sides of the wave form shown in FIG. 8(B). FIG. 8(E) shows frame pulses. FIG. 8(F) shows a monostable multivibrator wave form triggered by the frame pulses shown in FIG. 8(E) and having a pulse width of the time constant of about 1 millisecond. FIG. 8(G) shows an output of an AND gate of the pulses of FIG. 8(D)

and of the pulses having a polarity reversed from that of the pulses of FIG. 8(F). FIG. 8(H) shows an output of an AND gate of the pulses of FIG. 8(F) and of the pulses of FIG. 8(D). FIG. 8(I) shows an output of a flip-flop circuit which is set and reset by the outputs of FIGS. 8(G) and 8(H). The output of the flip-flop circuit os FIG. 8(I) is used as principal switching pulses for low carrier wave frequency modulated signals.

Similar flip-flop circuits are connected in cascaded multiple stages. Thus, a repeat cycle can be varied in any arbitrary fashion in a unit of multiples of field periods in playback. FIG. 8(J) shows pulses formed responsive to a picking out of only the trailing sides (rear edges) of the pulses of FIG. 8(I). These pulses used for controlling the operation of the pulse motor 16, for example. FIG. 8(K) shows the shut-off and starting of the pulse motor 16, with horizontal portions representing the shut-off periods and angle portions representing the stepping periods.

The pulse motors are of the type to which a current is passed continuously. They are kept shut-off in a stable manner by a suitable holding torque of the electromagnetic force, in the absence of drive pulses. By utilizing the shut-off periods, only the field periods $F_1$, $F_3$, $F_5$ . . . (odd number fields) of the frequency modulated low carrier wave signals of FIG. 8(A) (which correspond to the plus side of the pulses of FIG. 8(I)) are switched by means of the switching pulses of FIG. 8(I). The result is the signals shown in FIG. 8(L). These signals are fed from the recording amplifier 26 of the first channel to the magnetic head 14 of the first channel, to be subsequently recorded on the magnetic sheet 10 in concentric circular tracks. On the other hand, a similar control recording is effected through the second channel by utilizing pulse motor drive pulses of FIG. 8(M), pulse motor step/stop pulses of FIG. 8(N), and switched frequency modulated signals of FIG. 8(O).

From the foregoing description, it will be appreciated that the frame pulses (FIG. 8(E)) passed through the AND gate circuit lock the main switching pulses (FIG. 8(I)) with respect to the polarity and phase of the relation between odd number fields and even number fields. The pulse motor control pulses (FIGS. 8(J) and 8(M)), which control the movements of the two magnetic heads 14 and 15 shown in FIGS. 1 and 3, are also locked with respect to the polarity of the switching pulses. Thus, the magnetic head 14 records only the odd number fields, and the magnetic head 15 records only the even number fields of the video signals, in a controlled manner at all times. No problems of reversed polarity and phase deviation are encountered.

In the playback operation, the signals shown in FIGS. 8(L) and 8(O) may be considered to be switched RF output signals from the pre-amplifiers 37 and 38. The operation is carried out in the same fashion as during the recording operation. Therefore, all that has to be done is to combine these signals into a continuous frequency modulated signal and to introduce the same to the frequency demodulator 51.

Means are provided for shaping the switching pulses for field setting. The signal processing copes with either a delay in time corresponding to the H/2 period or the shaping of the signals into non-symmetrical switching pulses based on equalizing pulses. Various forms of field setting in still playback and slow motion playback, explained in Point (2), above will now be explained. FIGS. 9(A) and 9(B) show outputs of the flip-flop circuits adapted to be set and reset by the pulses and outputs of FIGS. 8(C) and 8(G) and FIGS. 8(C) and 8(H) respectively. These outputs are non-symmetrical pulses which are normally produced in the described shaping order, based on either the input standard video signals or the external reference synchronizing signals. The question is the same during recording, normal playback, slow motion playback or still playback.

FIG. 9(C) shows wave forms of the main switching pulses that are produced from the output of FIG. 8(I) when a slow motion ratio variation knob is gradually turned manually in conjunction with some manipulation of the apparatus. The setting range from 1 : 1 (normal), to 2 : 1, 3 : 1 . . . *n* : 1 in the playback operation. FIG. 9(D) shows pulses whose polarity is reversed from that of the pulses of FIG. 9(C). FIG. 9(E) shows motor drive pulses, for the first channel, shaped from the trailing sides of the pulses of FIG. 9(C). The pulses of FIG. 9(E) are pulse motor control pulses which step and stop the pulse motor 16 for the first channel as shown in FIG. 9(F).

Reproduced RF signals from the preamplifier 37 of the first channel are processed such that the portions thereof which correspond to their positive polarity are switched by the switching pulses of FIG. 9(C). Only the odd number fields $F_1$, $F_3$, $F_5$ . . . of the recorded information signals are taken out as shown in FIG. 9(G) in conformity with the slow motion ratio. On the other hand, the pulse motor control pulses (FIG. 9(H)) for the second channel shaped from the leading sides of the pulses of FIG. 9(C) step and stop the pulse motor 17 for the second channel in a form shown in FIG. 9(I). Only the even number fields $F_2$, $F_4$, $F_6$ . . . of the reproduced video frequency outputs from the pre-amplifier 38 of the second channel, which corresponds to the negative polaıty portions of the pulses of FIG. 9(C), are switched as shown in FIG. 9(J). The signals of FIGS. 9(G) and 9(J) are combined into a continuous video frequency signal which is introduced into a frequency demodulator and demodulated into a video signal. However, the video signal has not been subjected to field setting and therefore cannot be introduced into a monitor as it stands. It is introduced into the terminal 42 of the field setter circuit shown in FIGS. 3 and 4, as aforementioned. It will thus be seen that, in order that the demodulated video outputs may be positively subjected to field setting, it is necessary that the field setting pulses shown in FIG. 7(E) be provided as explained previously in Point (2).

The method of shaping and processing the field setting pulses, shown in FIG. 7(E), will now be explained. FIGS. 9(K) and 9(L) show pulses that are obtained by AND gating the pulses of FIGS. 9(B) and 9(C) and FIGS. 9(A) and 9(D) respectively. If gated again, the gated outputs of FIGS. 9(K) and 9(L) will produce pulses shown in FIG. 9(M). Pulses shown in FIG. 9(N) whose polarity is reversed from that of the pulses of FIG. 9(M) are similar to the field setting pulses shown in FIG. 7(E). It will thus be understood that the field setting pulses (FIG. 7(E) and FIG. 9(N)) can be shaped completely by AND gating the main switching pulses (FIGS. 9(C) and 9(D)) and the pulses of non-symmetrical wave forms of FIGS. 9(A) and 9(B) which are shaped from equalizing pulses. The relationship between odd number fields and even number fields of the recorded information and the outputs of the flip-flop circuit shown in FIGS. 9(A) and 9(B) are synchronized. Their phases are set by the frame pulses of FIG. 8(E).

Thus, it is possible to obviate the problem encountered in effecting field setting. The problem is that the relation between odd number fields and even number fields of the signals, that are subjected to the field setting, does not agree with the relation between odd number fields and even number fields of the external reference synchronizing signals, so long as the field setting pulses of FIG. 9(N) are introduced to the terminal 45 of FIGS. 3 and 4 for effecting field setting. Also, since the field setting is effected in the present invention by switching signals as shown in FIGS. 7(C), 7(D) and 7(E) by the non-symmetrical switching system, the vertical synchronizing signal portions of the fields are arranged on either the non-delay side or the H/2 period delay side of the switcher 49. The fields (are arranged on the non-delay side in the embodiment described, but they may be arranged on the H/2 period delay side, if the reverse switching polarity is selected). The problem of deviation in time of the vertical synchronizing signal periods from the 1/60 second cycle, resulting from field setting, can be obviated. Also, any field setting pulses can be shaped and produced automatically by some manipulation of the apparatus, by virtue of the aforementioned gating operation. Thus, the present invention permits field setting in a positive and a stable manner.

The reasons why any field setting pulses can be automatically shaped by using the logical circuits in conjunction with some manipulation of the apparatus will be explained more in detail. The logical circuits comprising the flip-flop circuits of the setting and resetting type, AND gate circuits and gate switches and pulse shaping amplifiers are connected directly. Reproduced signals are standard signals in a normal playback of 1 : 1. Thus, it is necessary to stop the switching operation of the field setter during normal playback. However, in such a case, it is necessary to relay on a purely electronic turning-on and turning-off operation by the logical circuits, without using relays or the like.

That is, no gated output can be produced since the switching pulses of FIG. 9(C) are identical with the switching pulses of FIG. 8(I), the pulses of FIGS. 9(C) and 9(D) or the pulses of FIG. 8(I). The pulses polarity is reversed from that of the pulses of FIG. 8(I). The pulses of FIGS. 9(A) and 9(B) are of the polarity which does not permit a gating of the pulses. Thus, only the direct current potential is applied to the terminal 45 of the field setter circuit 44 shown in FIG. 4 because of the aforementioned direct connection. Thus, the switcher operates such that, for example, only the direct current signals *b* are passed.

During still playback, the same field is reproduced repeatedly. The field setter has only to pass signals by successively switching between non-delay and H/2 period delay, depending on the fields. In this case, the switching pulses of FIG. 9(A) or FIG. 9(B) may be used as field setting pulses. This means that in still playback, one of the pulses of FIGS. 9(C) and 9(D) is maintained at a zero potential while the other is kept at a suitable potential as they are supplied to the AND gate, and that they are supplied to the field setting circuit 44 in a form which corresponds to one of the outputs FIGS. 9(A) and 9(B). It is to be understood that the reproduced FM outputs are converted into a continuous FM signal consisting of one of the pulses of FIGS. 9(G) and 9(J) in this case.

It should be understood that the signal processing system according to this invention is not limited to the embodiment described herein, and that many changes and modifications may be made therein without departing from the spirit and scope of the invention.

What is claimed is:

1. A signal processing system for magnetic recording and reproducing apparatus comprising means including a plurality of magnetic heads for recording video signals on and reproducing the same from each track on a rotary magnetic body, means responsive to control pulses for moving said magnetic heads intermittently and alternately to record each field of said video signals, means for synchronizing magnetic head switching pulses derived from the video signals and recorded by said magnetic heads with said control pulses for controlling the intermittent movements of the magnetic heads, means for controlling said recording and reproducing means depending on the relation between odd number fields and even number fields of each of said video signals, pulse width limited means for starting said recording or reproducing after switching transients subside and ending said recording or reproducing before new switching transients begin, and means responsive to equalizing pulses inserted in the vertical synchronizing periods of the video signals as reference signals for shaping said field setting pulses into non-symmetrical rectangular wave pulses.

2. A signal processing system as defined in claim 1 further comprising means for varying the rate of the movements of said magnetic heads for effecting field setting when slow motion playback or still playback of the signal recorded in each of said tracks is effected, said pulse width limited means comprising a source of external reference synchronizing signals, means whereby said field setting is effected responsive to said reference signals such that the relation between odd number fields and even number fields of a reproduced video signal is made to agree with the relation between odd number fields and even number fields of said reference signals, and means whereby field setting pulses are synchronized and shaped by frame pulses of the external synchronizing signal in order to start and end said signals and eliminate said transients.

3. A signal processing system as defined in claim 1 further comprising electronic logical circuit means for gating said switching pulses and field setting switching pulses and for automatically shaping various types of field setting pulses, and means for effecting field setting when slow motion playback or still playback of the signal recorded in each said track is effected, said pulse width limiting means comprising a source of external reference synchronizing signals, means whereby said field setting is effected responsive to field setting pulses such that the relation between odd number fields and even number fields of a reproduced video signal is made to agree with the relation between odd number fields and even number fields of said external reference synchronizing signal.

4. A signal processing system as defined in claim 1 further comprising means for effecting field setting such that the relation between odd number fields and even number fields of a reproduced video signal is made to agree with the relation between odd number fields and even number fields of said external reference signal, said last named means being operated responsive to said field setting pulses shaped by said shaping means when slow motion playback or still playback of the signal recorded in each said track is effected.

5. A signal processing system as defined in claim 1 and switching means having a non-delayed input and an input delayed by an H/2 period, means for effecting field setting by arranging the vertical synchronizing signal portions of the frames on either the non-delay side or H/2 period delay side depending on the fields, said last named means being operated responsive to said field setting pulses shaped by said shaping means when slow motion playback or still playback of the signal recorded in each said track is effected.

6. A signal processing system for magnetic recording and reproducing apparatus comprising means including two magnetic heads for recording video signals on and reproducing the same from concentric tracks on a rotary magnetic body, means responsive to control pulses for moving said magnetic heads intermittently and alternately to record or reproduce each field of said video signals, a source of external reference synchronizing signals, means for synchronizing said control pulses with said external reference synchronizing signals, frequency-modulator means for frequency-modulating a carrier signal responsive to video signals reproduced by the magnetic heads, means for inserting equalizing pulses in the vertical synchronizing periods of the video signals for generating field setting pulses of a non-symmetrical rectangular wave form, the portions of the field setting pulses corresponding to the vertical synchronizing signal interval of the video signals always being on one of the levels of the non-symmetrical rectangular wave form, switching means having an input connected to receive a non-delayed output of the frequency modulator means and an input connected to receive a delayed output of the frequency modulator means, said delay being an H/2 period, means responsive to said field setting pulses for operating said switching means and passing therethrough the non-delayed input signal and the delayed input signal depending on said non-symmetrical rectangular wave form, whereby the relation between odd number fields and even number fields of a reproduced video signal is made to agree with the relation between odd number fields and even number fields of said external reference synchronizing signal, limiter means for limiting the amplitude of the output of said switching means, and means for frequency-demodulating the output signal of said limiter means.

7. The signal processing system as defined in claim 6 and a resonant circuit means tuned to the frequency of the equalizing pulses, said means for using equalizing pulses for generating field setting pulses comprising means for separating the equalizing pulses from the video signal by said resonant circuit.

* * * * *